No. 749,286. PATENTED JAN. 12, 1904.
H. J. GERNER.
CONTINUOUS ICE CREAM FREEZER.
APPLICATION FILED JAN. 24, 1903.
NO MODEL. 4 SHEETS—SHEET 1.
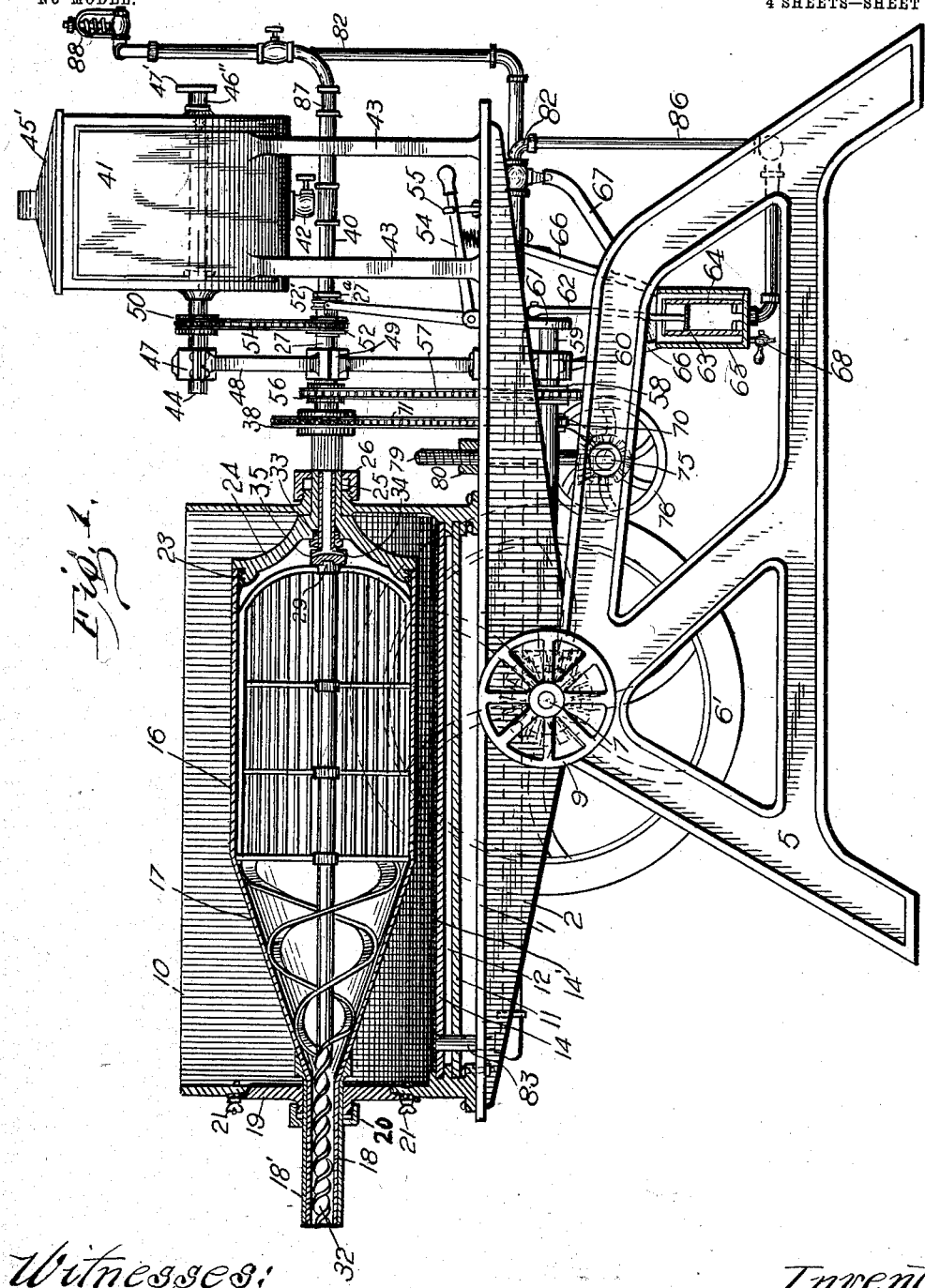
Witnesses:
D. C. Wilson
Inventor
HENRY J. GERNER.
By H. C. Evert
Attorneys

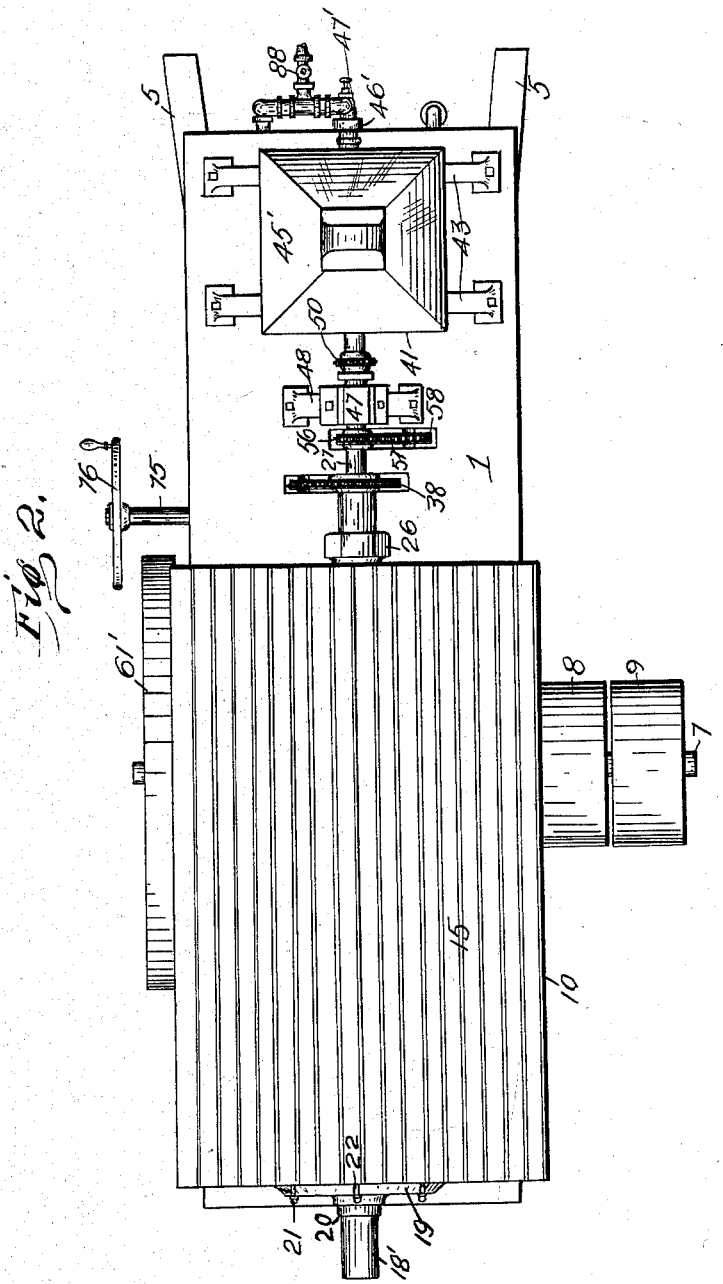

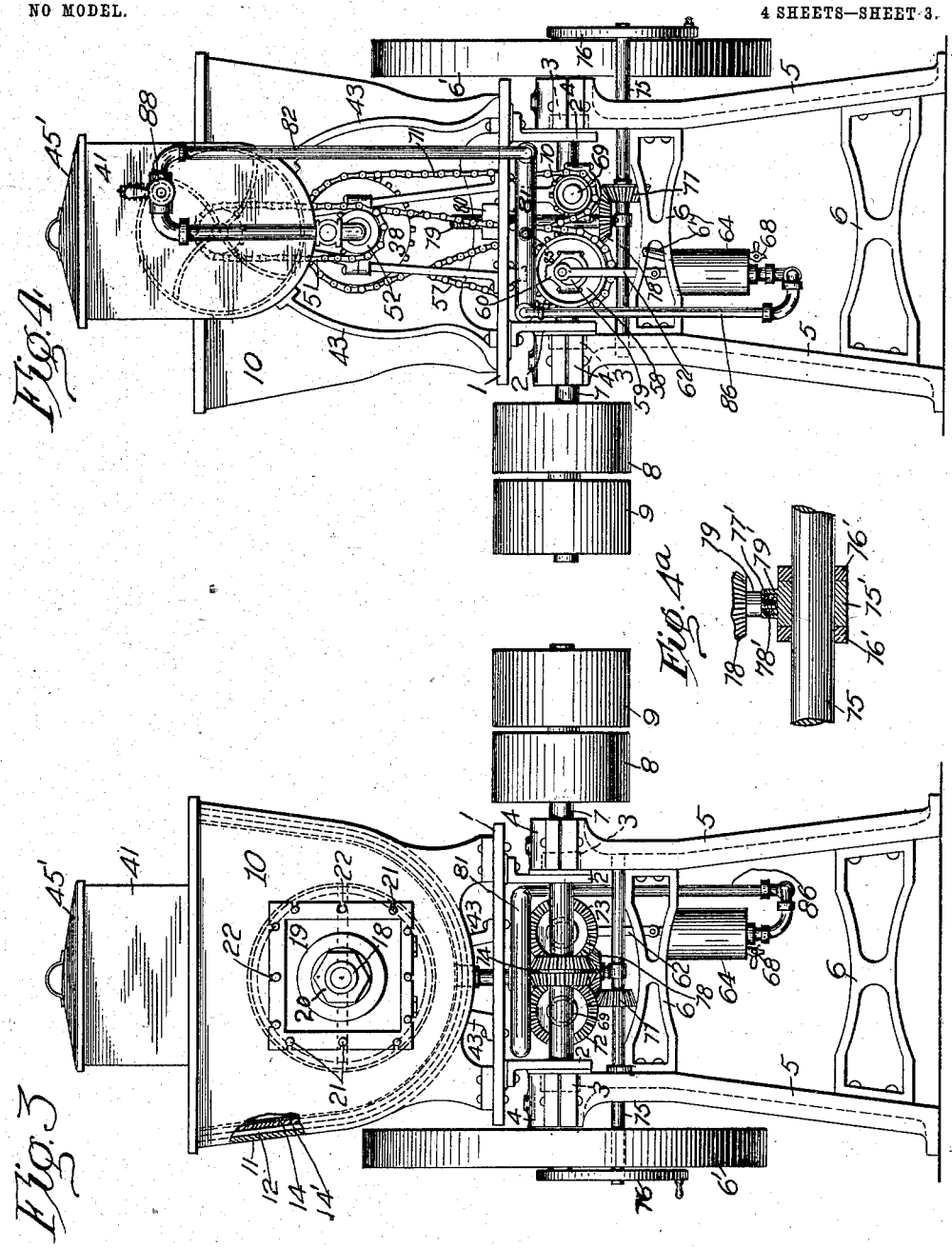

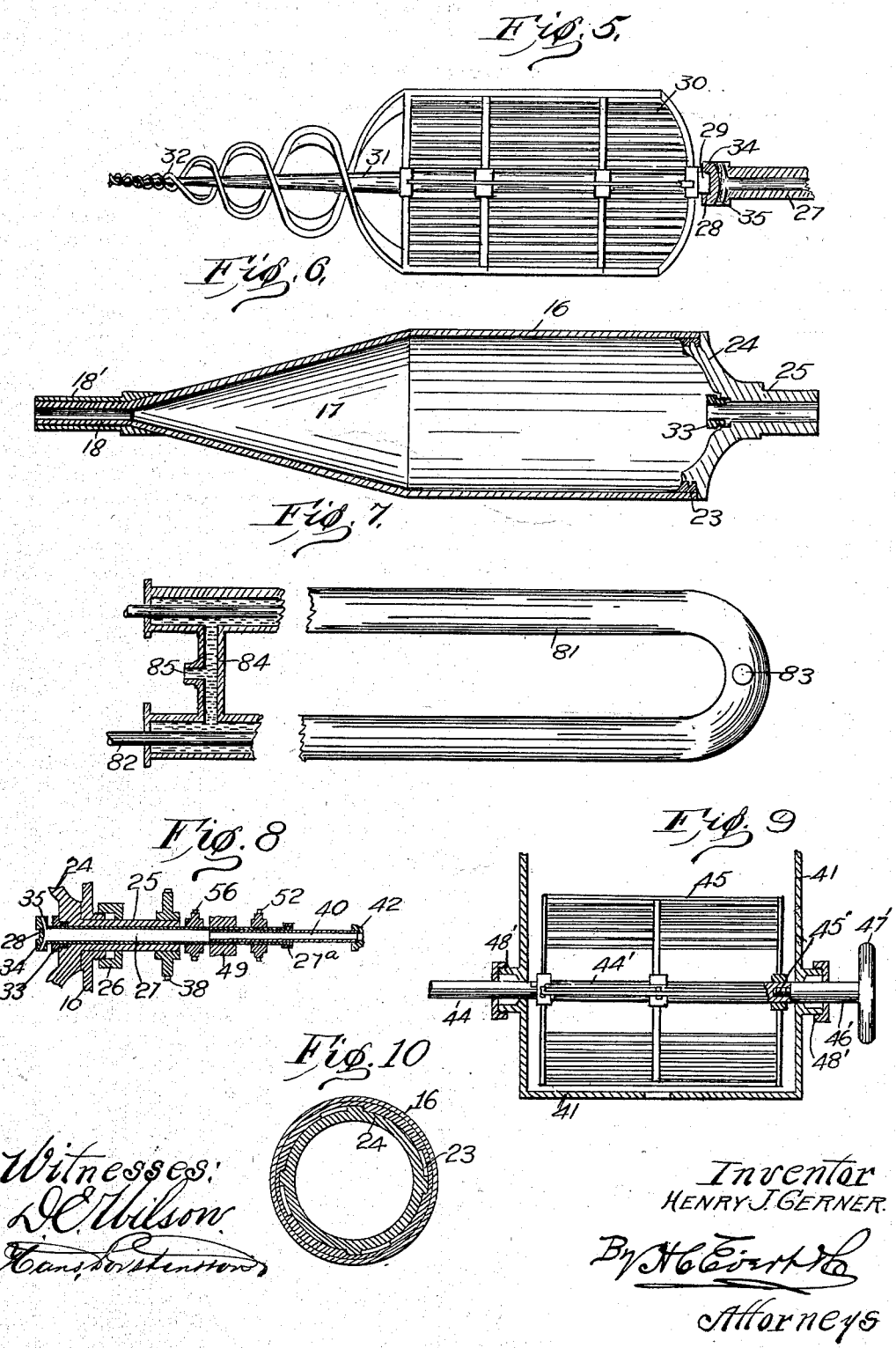

No. 749,286. Patented January 12, 1904.

UNITED STATES PATENT OFFICE.

HENRY J. GERNER, OF VANDERGRIFT, PENNSYLVANIA.

CONTINUOUS ICE-CREAM FREEZER.

SPECIFICATION forming part of Letters Patent No. 749,286, dated January 12, 1904.

Application filed January 24, 1903. Serial No. 140,419. (No model.)

*To all whom it may concern:*

Be it known that I, HENRY J. GERNER, a citizen of the United States of America, residing at Vandergrift, in the county of Westmoreland and State of Pennsylvania, have invented certain new and useful Improvements in Continuous Ice-Cream Freezers, of which the following is a specification, reference being had therein to the accompanying drawings.

This invention relates to certain new and useful improvements in continuous ice-cream freezers, and has for its object to construct a freezer wherein the cream previous to its entrance into the freezer proper is subjected and conveyed to the freezer by a blast of cooled air, whereby to reduce the temperature of the cream previous to its entrance into the freezer, and thereby shorten the time necessary to bring the cream to the frozen state.

A further object of the invention is to construct a freezer with means for continuously supplying the cream to the freezer proper and means for conveying the frozen cream from the freezer as it reaches the desired frozen state.

A still further object of the invention is to construct a freezer of this type so arranged that the freezer proper may be readily removed from the tub or receptacle carrying the freezing agent, whereby to permit the effectual cleansing of the freezer mechanism.

Another object of the invention is to construct a freezer with a hollow dasher-shaft through which the cream is conveyed from the receptacle containing the cream to the freezer.

Another object of the invention is to construct a device of this character with a horizontally-arranged freezer and to provide means whereby this freezer may be tilted or inclined to elevate the forward end of the same in order that cream may be retained in the rear end in event of its freezing slowly, and which freezer may be inclined in the opposite position to elevate the rear end in order that the cream in case it freezes rapidly may be the more freely discharged from the freezer.

A still further object is to provide for the continuous supply of cream from the reservoir to the freezer, whereby to maintain a working quantity of cream in the freezer at all times, the cream as it is frozen being discharged by mechanism in the freezer provided for that purpose.

A still further object of the present invention is to construct a device of this character wherein the cream may be subjected to the action of an agitator previous to its being conveyed to the freezer, this agitator, together with the subjection of the cream to the action of the cooled air prior to discharging the cream into the freezer having a tendency to create a light foam on the cream, and thereby materially assist in diminishing the required time to bring the cream to a frozen state, as well as imparting to the frozen cream a smoother and more tasteful effect.

Still further objects of the invention reside in the novel construction for feeding the cream from the reservoir to the freezer, in the construction of the agitator within the freezer and the conveyer for discharging the frozen cream from the freezer, in the mechanism for tilting the freezer, whereby to elevate either end thereof, in the means provided for supplying the air, in the novel means for cooling this air, and in various other novel features of construction, which will be hereinafter more fully described and then particularly pointed out in the appended claims.

In describing the invention in detail reference is had to the accompanying drawings, forming a part of this specification, and wherein like numerals of reference indicate like parts throughout the several views, in which—

Figure 1 is a detail side elevation of my improved freezer, showing the air-pump in vertical section and the tub for the freezing agent, together with the freezer proper, in longitudinal section. Fig. 2 is a detail top plan view of my improved freezer. Fig. 3 is a front elevation of the same. Fig. 4 is a rear elevation thereof. Fig. 4ª is an enlarged sectional view of the swivel end of the tilting screw, showing a part of the operating-shaft thereof. Fig. 5 is a side elevation of the freezer-agitator, showing a part of the hollow dasher-shaft. Fig. 6 is a longitudinal sectional view of the freezer-can with the agitator removed. Fig. 7 is a plan view, partly broken away and partly in section, of the salt-water drain-pipe through which the air-pipe extends. Fig. 8 is a longitudinal sectional view of the hollow dasher-shaft and sprockets thereon, showing also a part of the head of the freezer-can and a part of the pipe that establishes communication between the reservoir and hollow dasher-shaft. Fig. 9 is a detached view of a part of the reservoir or cream-tank, showing the agitator and manner in which same is mounted. Fig. 10 is a transverse vertical sectional view of the freezer-can, showing how the same is secured in the head.

As heretofore stated, the freezer-can is mounted in a horizontal manner, and means is provided for rotating this can and also means whereby this freezer-can may be tilted so as to elevate the one end thereof above the other end as may be desired. To this end I provide a table 1, carried by brackets 2, provided with bosses 3, (see dotted lines, Fig. 3,) which engage in the bearings 4, carried by the side frames 5, which support the mechanism. These side frames 5 may be of suitable form and are preferably connected by crossbraces 6 6, whereby to give the desired rigidity to the supporting-frame. A drive-shaft 7 is journaled in the bearings 4 and extends through the bosses 3 of the brackets 2 and through said brackets and on its one end carries a suitable fly-wheel 6' and on its other end is provided with a drive-pulley 8 and a loosely-mounted pulley 9, the latter being adapted to receive the belt when it is not desired to rotate the drive-shaft, as is well known in various arts. Mounted on the table 1, adjacent the one end thereof and over the drive-shaft 7, is a tub or other like receptacle 10 to receive the freezing agent. This tub or receptacle 10 is of particular construction, being of a plurality of thicknesses of material, the outer layer 11 being preferably constructed of wood, with a space 12 between said outer layer of wood and the inner lining or layer of wood 14, and on the inner layer of wood 14 is a layer or lining of zinc or other like material 14'. The cover 15 may or may not be hinged to the tub, as may be desired. The freezer-can 16 is mounted horizontally in the tub 10 and has a substantially circular body merging at one end into the conical-shaped portion 17, terminating in the discharge-nipple 18, which extends through and revolves in the reinforcing-sleeve 18', that is mounted in the hinged end 19 of the tub 10. A suitable stuffing-box 20 surrounds the reinforcing-sleeve 18' and is connected to the boss or enlargement provided therefor on the outer face of the hinged end 19 of the tub 10. This portion 19 in the end of the tub is hinged along its lower edge and is fastened in position by means of swiveled set-screws 21, carried by the end of the tub, the shanks of which engage in the notches 22, provided therefor in the edge of the hinged portion 19. These securing set-screws 21 are of a form well known for various purposes and which when the nut on the screw is loosened may be moved away from the recess, whereby to clear the hinged portion 19 and permit the latter to swing downwardly. The edges of the hinged portion 19 are so mitered as to fit neatly with the edges of the cut-away portion which receives the portion 19, whereby to form a tight joint. This hinged portion is provided to afford means whereby the freezer-can when disconnected at its opposite end may be elevated at said opposite end so as to clear the tub, and thus permit the removal of the freezer-can, together with the agitator or conveyer therein, to permit the ready cleansing thereof. At its rear or larger end the freezer-can is connected by the half-threads 23 with similar half-threads on the flared head 24, carried by the bearing-sleeve 25. This bearing-sleeve 25 is journaled in the rear end of the tub 10 and passes through the stuffing-box 26, secured to the boss provided therefor on the rear end wall of the tub. A hollow dasher-shaft 27 extends through the sleeve 25, this shaft being provided in its outer end with a socket 28 to receive the nut 29, carried on the inner end of the dasher or agitator 30. This dasher or agitator may be of any approved form, the present illustration being that of the construction embodying the central shaft with a series of arms extending radially therefrom on which the agitating bars or dashers are mounted, the shaft 31 being extended forwardly beyond the dasher proper and through the funnel-shaped portion 17 and the nipple or discharge-sleeve 18 of the freezer-can. Spirally arranged around this extending portion of the shaft 31 are the conveying-screws 32, so arranged to engage with the inner wall of the cone-shaped portion 17 of the freezer-can and remove the material therefrom, conveying the same through the nipple or discharge-sleeve 18. A packing-gland 33 is inserted in the head 24 around the hollow dasher-shaft 27, and this shaft is provided with a head 34, having transverse openings 35, communicating with the central bore of said shaft. The sleeve 25 receives the hollow dasher-shaft 27 and has mounted thereon the sprocket-wheel 38. Extending into the hollow dasher-shaft 27 is a pipe 40, communicating with the reservoir or cream-tank 41 through the controlling-valve 42. The reservoir or cream-tank 41 is supported by standards 43, which rest upon the table 1, and in one wall of the reservoir or cream-tank 41 is mounted a shaft 44, having a nut on its inner end to engage in a recess provided therefor in the end of the shaft 44', which carries the agitators 45. A suitable lid 45' is provided for this reservoir or cream-tank. One end of the shaft 44 extends some distance beyond the reservoir or cream-tank and is journaled in the bearing 47, carried by the standards 48, supported from the base. These standards also have an intermediate bearing 49, through which the hollow dasher-shaft 27 extends. Mounted on the shaft 44 between the bearing 47 and the reservoir or cream-tank is a sprocket or gear wheel 50, which receives the chain 51, also operating over the sprocket or gear wheel 52, which is mounted on the hollow dasher-shaft 27. The sprocket or gear wheel 52 is loosely mounted on the hollow dasher-shaft, whereby the operation of the agitator in the reservoir or cream-tank may be discontinued, if desired, without ceasing the operation of the dasher in the freezer-can. To this end I provide a clutch 52′ of ordinary form of construction, controlling the same by means of the spring-pressed lever 54, which I lock to hold the clutch in open position by means of the hook 55, carried by the table 1. Also mounted on the hollow dasher-shaft 27 is a sprocket-wheel 56, which receives the chain 57, passing over said sprocket or gear wheel and over like gear or sprocket wheel 58, carried on the shaft 59, extending longitudinally of the machine underneath the bed. The shaft 44′ of the agitator in the reservoir is provided at its opposite end with a threaded socket to receive the threaded end 45″ of the stub-bearing shaft 46′, which is journaled in one wall of the reservoir and carries a hand-wheel 47′ for operating. The shafts 44 and 46′ extend through suitable stuffing-boxes 48′. By this means of construction I am enabled to readily remove the agitator 45 for the purpose of cleansing the same, simply unscrewing stub-shaft 46′ and then shifting agitator 45 laterally to disengage the nut on end of shaft 44 from recess in end of shaft 44′, so that the agitator may be lifted out. This nut on shaft 44 and the recess in shaft 44′ are of the same construction as shown for the recess 28 and nut 29 by which the hollow dasher-shaft is connected to the agitator 30. The shaft 59 is journaled in suitable bearings 60, carried by the bed or table, and is provided on its rear end with a pitman 61, to which is connected the pitman-rod 62, pivotally attached to the stem of the piston 63, which operates in the cylinder 64 of the air-pump. This cylinder 64 of the air-pump is provided with a water-jacket 65, whereby the cylinder may be kept cool at all times, the cylinder and water-jacket being supported by brackets 66, suspended from the bed or table of the machine, water being fed to the water-jacket 65 through the pipe 67 and the water being drained from said jacket through a suitable drain-cock 68. The shaft 69 is journaled in suitable bearings suspended from the bed or table and has a sprocket-wheel 70, which receives the chain 71, passing over said wheel and over the wheel 38. The shafts 59 69 carry beveled pinions 72 73, respectively, which engage with the double beveled pinion 74, mounted on the drive-shaft 7, whereby a simultaneous movement in reverse directions is imparted to the shafts 59 69. The table is tilted whereby to incline the freezer-can in order to retain the cream at the rear end of the can in event of the cream freezing slowly or to elevate the rear end of the can and incline the forward end of the same, whereby to more rapidly discharge the frozen cream by means of the shaft 75, which is journaled in the framework and is provided at one end with a suitable operating-wheel 76. This shaft 75 carries a beveled pinion 77, which meshes with the beveled pinion 78, carried on the vertical screw 79, swiveled to the shaft 75. The manner of swiveling the screw 79 to the shaft 75 is best seen in Fig. 4ª and consists of a collar 75′, held in position on the shaft 75 by collars 76′. The shaft 75 is free to be rotated in the collar 75′, which latter carries an open box or frame 77′ to receive the lower threaded end 78′ of the screw 79, which is held therein by nuts 79′ within the open box or frame 77′. The screw 79 passes through the cross-head 80, mounted on top of the table or bed 1 and rigidly secured thereto. Arranged beneath the table and substantially in the form of a U, is a salt-water drain-pipe 81, through which the air-pipe 82 extends, there being a considerable space between the air-pipe and the interior wall of the drain-pipe in order that the salt water may freely circulate around the air-pipe and cool the air during its passage through said pipe. This drain-pipe 81 is connected to the freezing-agent tub 10 by a short pipe 83, the water draining down through said pipe into the drain-pipe 81 toward the ends of the legs of said pipe and exhausting through the connecting branch 84 and exhaust 85 and through pipe 67, which connects with port 85 into the space around the cylinder and through drain-cock 68, with which latter a pipe may be connected for conducting the water to any desired point. The ends of the legs of the U-shaped drain-pipe 81 are closed, except for the apertures in said closed ends to permit the passage of the air-pipe 82. This air-pipe 82 is connected by a branch 86 with the cylinder 64 of the air-pump, the other end of said air-pipe being extended upwardly to a height equal with the top of the reservoir or cream-tank and being then given a return-bend and connected by the union 87 with the pipe 40. I extend this air-pipe upwardly to a height equal to the height of the reservoir or cream-tank, whereby to prevent any backflow of the cream from the tank into the air-pipe, and at the upper end of the air-pipe I provide the same with a suitable blow-off valve 88, whereby any excess pressure over and above the pressure to which the blow-off valve 88 is set will be discharged to the atmosphere and an even pressure of the air in the hollow dasher maintained.

In operation the cream is placed in the reservoir or cream-tank 41 and the flow of the same into the pipe 40 regulated by means of the controlling cock or valve 42. Any suitable driving power may be employed, the drive-belt (not shown) being shifted onto the drive-pulley 8, whereby to rotate the driveshaft 7 and through the medium of the double pinion 74 and pinions 72 73 impart an opposite rotary movement to the shafts 59 69 and through the rotation of these shafts impart an opposite rotation to the hollow dasher 27 and freezing-can 16 through the medium of the connecting-chains 57 71. The rotating of the hollow dasher-shafts imparts movement to the agitator or dasher in the cream-can through the medium of the drive-chain 61. The driving of the shaft 59 operates the piston 63 through its connections therewith, so as to force the air through branch pipe 86 into the air-pipe 82, this air being discharged from said pipe 82 into the end of the pipe 40 and into the hollow dasher 27 to force the cream through said pipe into the hollow dasher, where it is discharged into the cream-can through transverse ports or passages 36. Should a greater quantity of air be forced into the pipe 82 than is desired, (the desired amount being controlled by the blow-off valve 88,) any excess in the air-pressure will be discharged to the atmosphere so as to always maintain the desired pressure. As the cream is forced into the freezer-can by the action of the blast of air, which air has been cooled or reduced to a very low temperature by its passage through the portion of the air-pipe which is arranged in the drain-pipe 81, the cream is discharged into the freezer-can at a comparatively low temperature, thereby aiding in the rapidity with which the cream is frozen in the can. As the cream is frozen and becomes stiff it has been worked to the conical end of the freezer-can by the action of the dasher and is there engaged by the conveyer 32 and conducted by said conveyer through nipple or dischargetube 18, where it is received in any suitable vessel provided therefor. When it is observed that the cream is freezing slowly and it is desired to retain the same within the freezer-can until it has been frozen to a greater extent, the tilting device heretofore described is operated, whereby to tilt the mechanism to lower the rear end of the freezer-can, and thereby hold or retain the cream in the rear end of said can and subject the same to a greater freezing action, and where the cream is observed to be freezing rapidly the mechanism is tilted into the opposite direction, whereby to lower the forward end of the freezer-can in order that the conveyer will the more rapidly discharge the frozen cream from the can. If at any time during the operation of the machine it is observed that the cream in the reservoir or cream-tank has been agitated to a sufficient extent, the clutch 53 is disengaged, whereby the operation of the agitator or dasher in the reservoir or cream-tank is discontinued without discontinuing the operation of the machine. As the supply of cream in the reservoir or tank is replenished the clutch 52' may be again thrown into operation, whereby to operate the agitator in the reservoir or cream-tank simultaneously with the operating of the dasher in the freezing-can.

By providing the hinged end in the freezing-agent tub and by connecting the large end of the freezer-can by half-threads to the head 24 I am enabled by simply giving the freezer-can a half-turn to disconnect the same from the head 24, and then by lowering the hinged portion 19 in the forward end of the tub elevate the larger end of the freezer-can from the tub and withdraw the freezer-can from the tub for ease and convenience in cleansing the same.

Although I have shown a machine as constructed to be driven by steam or other like power, yet it will be observed that a smaller machine constructed on the same principles may be operated by hand. I desire also to call attention to the fact that by the agitation of the cream considerable life, so as to speak, is imparted thereto. This life which is imparted to the cream is maintained, and, in fact, furthered by intercepting the cream with the cooled air-blast, the latter striking the cream with considerable force, whereby to create a spray of foam, which is furthered by the egress of the cream through the hollow dasher-shaft, and the cream being discharged through the transverse ports 35 against the rapidly-revolving freezer-can and dasher. I have demonstrated in practice that by this method I am enabled to produce a cream of superior quality, possessing the properties of being extremely light and highly tasteful.

The hollow dasher-shaft 27 is provided at its rear end with a suitable stuffing-box $27^a$, whereby to prevent any leakage. In the present illustration of the invention I have shown the air for the blast supplied by a pump, though it will be observed that a fan or other equivalent device could be used for this purpose. The employment of the freezer-can arranged horizontally enables me to continually feed the cream to the can, or, in other words, to obtain and maintain a continuous freezing process, which could not be accomplished if the can were placed vertically, as with a vertical can the cream would be discharged through the other end of the can before it could be frozen.

While I have shown herein and described the mechanism in detail, yet it will be observed that in the practice of the invention various changes may be made in the details of construction without departing from the general spirit of the invention, and I do not wish to confine myself to the construction herein shown and claim the right to alter the same in any manner that may be permitted by the scope of the appended claims.

Having fully described my invention, what

I claim as new, and desire to secure by Letters Patent, is—

1. In a device of the type set forth, the combination of a freezer-can, with means for rotating the latter, a hollow dasher-shaft, a dasher arranged within the freezer-can and connected to said shaft, means for operating said dasher and shaft in the direction opposite to the rotation of the freezing-can, means for cooling and conducting the cream into said hollow dasher-shaft and discharging the same into the freezer-can, and means for adjusting the position of the freezer-can to regulate the discharge of the frozen cream therefrom, substantially as described.

2. In a device of the type set forth, the combination of a horizontally-mounted freezer-can receiving the liquid to be frozen through one end and discharging the frozen substance through the opposite end, a liquid-supply tank, a hollow dasher-shaft extending into the freezer-can and through which the liquid is fed from the tank to the can, means for rotating the dasher-shaft and freezer-can in opposite directions, a dasher detachably connected to the dasher-shaft, a spiral conical conveyer connected to the dasher and terminating in a discharge-screw, and means for regulating the discharge of the frozen substance.

3. In a device of the character described, the combination of a freezer-can, means for imparting a rotary movement to said can, a hollow dasher-shaft extending into the can and through which the cream is conveyed to said can, a dasher connected to said dasher-shaft, means for rotating the dasher and dasher-shaft in the direction opposite to the rotation of the can, means for cooling the cream prior to its discharge into the can, and means for adjusting the position of the can to regulate the discharge of the cream therefrom, substantially as described.

4. In an ice-cream freezer, a rotating freezer-can, means for rotating said can, means for continuously supplying cream to said can during its rotation, a dasher arranged within the can, means for rotating said dasher in the direction opposite to the direction of the can, means within the can for discharging the frozen cream therefrom, and means for forcing the cream into the can under the action of cooled air, substantially as described.

5. In an ice-cream freezer, a rotatable freezing-can, means for rotating said can, a rotating dasher arranged within the can, means for rotating said dasher in a direction opposite to the direction of the rotation of the can, a reservoir or cream-tank in communication with the freezing-can, an agitator in said reservoir or cream-tank, and means for operating said agitator simultaneously with the operation of the freezer-can and dasher, substantially as described.

6. In an ice-cream freezer, a tilting table, a freezing-agent tub mounted thereon, a freezer-can mounted for rotation in said tub, a reservoir or cream-tank, a hollow dasher-shaft establishing communication between the reservoir or cream-tank and the freezer-can, a dasher connected to said hollow dasher-shaft, means for rotating the dasher and hollow dasher-shaft in a direction opposite to the rotation of the freezer-can, an agitator in the reservoir or cream-tank, means for operating said agitator simultaneously with the operation of the freezer-can and hollow dasher-shaft, and means for discontinuing the operation of the agitator in the reservoir or cream-tank, substantially as described.

7. In an ice-cream freezer, the combination of a rotatable freezer-can, a reservoir or cream-tank, rotatable connections between the freezer-can and the reservoir or cream-tank, a dasher in the freezer-can, means for rotating said dasher in a direction opposite to the direction of the freezer-can, an air-supply communicating with the connections between the freezer-can and the reservoir or cream-tank, and means for cooling the air-supply to said connection, substantially as described.

8. In an ice-cream freezer, a rotatable horizontally-arranged freezer-can, means for rotating said can, a hollow dasher-shaft, a dasher connected to said shaft, means for rotating said dasher-shaft and dasher in a direction opposite to the rotation of the can, a reservoir or cream-tank communicating with the freezer-can through said hollow dasher, an agitator in said reservoir for agitating the cream prior to its discharge into the hollow dasher, means for driving the agitator simultaneously with the dasher-shaft, and means whereby the actuation of the agitator may be discontinued without discontinuing the operation of the dasher-shaft, substantially as described.

9. In a freezer, the combination of a freezer-can, a hollow dasher-shaft extending into said can and through which the liquid to be frozen is fed into the can, a dasher connected to said shaft, means for rotating said hollow dasher-shaft and dasher, a reservoir communicating with the hollow dasher-shaft, an agitator in the reservoir, means connected to the hollow dasher-shaft for actuating said agitator simultaneously with the dasher-shaft, and a clutch for discontinuing the operation of the agitator independently of the dasher-shaft.

10. In an ice-cream freezer, a rotating freezer-can, means for rotating said can, a reservoir or cream-tank, connections establishing communication between the rotating freezer-can and the reservoir or cream-tank, and means for supplying cold air to said connections to cool the cream prior to its discharge into the freezer-can, substantially as described.

11. In an ice-cream freezer, the combination with a rotatable freezer-can and means for rotating said can, of a reservoir or cream-tank, a hollow dasher-shaft establishing communication between the reservoir and freezer-can, means for operating said hollow dasher-shaft, means within the can for discharging the frozen cream therefrom, and means for inclining the freezer-can to regulate the discharge of the frozen cream, substantially as described.

12. In an ice-cream freezer, a tilting table, means for tilting said table, a freezing-agent tub mounted on said table, a freezer-can journaled in said tub, means for operating said can, a hollow dasher-shaft for supplying cream to said can, a dasher connected to said shaft, a conveyer carried by the dasher for discharging the frozen cream from the can, and means for rotating said dasher-shaft, the dasher and the conveyer in an opposite direction to the rotation of the freezer-can, substantially as described.

13. In an ice-cream freezer, the combination with a freezing-agent tub and a reservoir or cream-tank, of a freezer-can mounted in said tub in communication with the reservoir or cream-tank, said can terminating in a funnel-shaped end, and means embodying a cone-shaped conveyer within the funnel-shaped end of said can for discharging the frozen cream therefrom, substantially as described.

14. In an ice-cream freezer, the combination with a rotatable freezer-can adapted to receive the cream through one end and discharge the frozen cream through the other end, and means for rotating said can, of a supply-reservoir or cream-tank, connections for normally maintaining communication between the cream-tank and the freezer-can, means for regulating the flow of cream from the tank to the can, a dasher within the can, means connected to the dasher for discharging the frozen cream through the discharge end of the can, and means for adjusting the can to regulate the discharge of the frozen cream.

15. In a continuous freezer, the combination with a freezing-agent tub, of a freezer-can horizontally mounted in the tub to receive the liquid through one end and discharge the frozen liquid through the opposite end, a liquid-tank for holding a quantity of liquid to be frozen, a normally open communication between the can and tank, means for regulating the quantity of the continuous flow from the tank to the can during the rotation of the can and to cut off the flow when the can ceases to rotate, means for rotating said can, a dasher within the can, means for rotating said dasher in the opposite direction to that of the can, means for continuously discharging the frozen substance during the rotation of the can and dasher, and means for regulating said discharge.

16. In a freezer of the type described, a bed or table, a freezing-agent tub mounted thereon, a freezer-can journaled in the tub to receive liquid in one end and discharge frozen liquid through the opposite end, means within the can to discharge the frozen liquid therefrom, and means for tilting the bed or table and inclining the freezing-agent tub and can to regulate the discharge of the frozen liquid from the can, substantially as set forth.

17. In a continuous ice-cream freezer, the combination with a supporting-frame, and a tilting table carried by said frame, of a reservoir or cream-tank supported on the table, a freezing-agent tub supported on the table, a freezer-can journaled in the tub and adapted to receive the cream in one end and discharge the frozen cream through the other end, means for continuously feeding the cream to the can during operation of the latter and regulating said feed, and means for discharging the cream as frozen and regulating said discharge.

18. In a continuous freezer, the combination of a rotatable freezer-can receiving and discharging at opposite ends, and means for rotating said can, a reservoir, connections between the can and reservoir for continuously supplying liquid during the rotation of the can, means for continuously discharging the liquid from the can as the liquid is frozen, and means for graduating said discharge.

19. In a continuous freezer, the combination with a supporting-table, and means for tilting said table, of a horizontal freezer-can mounted on the table and provided with a funnel-shaped discharge end, a liquid-supply tank or reservoir, connections establishing communication between the freezer-can and the supply tank or reservoir whereby liquid is continuously supplied to the freezer-can, and a conical conveyer in the funnel-shaped end of the can for continuously discharging the frozen liquid from the can.

20. In a continuous freezer, a rotatable horizontally-mounted freezer-can receiving through one port and discharging through another port, means for rotating said can, a support on which the can is mounted, means for tilting said support to incline the can at an angle to its horizontal axis, a liquid-supply, connections between the supply and the can for continuously supplying liquid to the can during the rotation of the latter, means for controlling said supply during the rotation of the can and for shutting off the supply when the rotation of the can is stopped, and means within the can for continuously discharging the frozen substance during the operation of said means.

21. In an ice-cream freezer, a horizontally-mounted freezer-can having a conical or funnel-shaped discharge end, a reservoir or cream-tank, a hollow dasher-shaft establishing communication between the freezer-can and reservoir or cream-tank, means for supplying air to the cream prior to its discharge into the freezer-can through the dasher-shaft, and means for rotating the freezer-can and the dasher-shaft in opposite directions, substantially as described.

22. In a freezer, a supporting bed or table, a freezer-can mounted on the bed or table to receive the unfrozen liquid in one end and discharge the frozen liquid through the other end, means for rotating said can, means for continuously supplying liquid to said can during its rotation, means for continuously discharging the frozen liquid during rotation of the can, and means for tilting the bed or table to incline the can and regulate the discharge of the frozen liquid.

23. In a freezer, a freezing-agent tub provided with a hinged end, and a freezer-can having one end sleeved in said hinged end and its other end detachably connected to the operating-shaft of the can whereby when said detachable end is disconnected and the hinged end of the tub lowered, the can may be removed from the tub, substantially as described.

24. In a freezer, a freezing-agent tub, mounted on a tilting support, in combination with a freezer-can journaled horizontally in said tub with its one end cone-shaped and terminating in a discharge-spout extending through the wall of the tub, means for rotating the can, a dasher within the can, a conveyer connected to the dasher and conforming to the conical end and discharge-spout of the can, means for rotating the dasher and conveyer, and means for tilting the support to incline the can and regulate the discharge of the frozen substance.

25. In an ice-cream freezer, the combination with a freezer-can, a reservoir or cream-tank in communication with said can and a freezing-agent tub in which the can is mounted, of an air-cooling pipe arranged underneath the tub and in communication therewith, an air-pipe extending through said air-cooling pipe and communicating with the freezer-can through the cream-supply thereto, and means for supplying air to the air-pipe, substantially as described.

26. In an ice-cream freezer, a rotatable freezer-can in communication with the cream-supply, means for rotating said can, and means for supplying a blast of cooled air to the cream prior to its discharge into the freezer-can, substantially as described.

27. In a freezer, a freezer-agent tub having a hinged portion in one end, in combination with a freezer-can having one end removably journaled in the hinged portion and its other end detachably connected to the driving-shaft of the can, as and for the purpose described.

28. In a freezer, a bed or table, a freezing-agent tub supported thereon, a freezer-can mounted for rotation in the tub, means for rotating the can, carried on said table, and tilting means for the bed or table whereby the can may be inclined at either end as it is being rotated, as and for the purpose described.

29. In an ice-cream freezer, the combination of a horizontally-mounted freezer-can receiving the liquid to be frozen through one end, and discharging the frozen substance through the other end, and means for tilting said can to regulate the discharge of the frozen substance therefrom.

30. In an ice-cream freezer, the combination with a horizontally-mounted freezer-can receiving the liquid to be frozen through one end and discharging the frozen substance through the opposite end, a cream-tank in communication normally with the freezer-can to continuously discharge cream into the can during the operation of the latter, means in the can for continuously discharging the frozen substance during the operation of said means, and means for varying the position of the can to regulate the discharge of the frozen substance.

31. In an ice-cream freezer, the combination with a rotatable freezer-can, a liquid-supply in communication with the can whereby liquid is continuously supplied to the can during the rotation of the latter, a rotatable dasher within the can carrying a discharge-screw for continuously discharging the frozen substance from the can, and means for tilting the can to regulate the discharge of the frozen substance.

32. In a liquid-freezer, the combination with a rotatable freezer-can, and means for rotating said can, a liquid-supply discharging continuously into one end of the freezer-can during the rotation of said can, a dasher in the can, means for rotating said dasher, a conical spiral conveyer connected to the dasher and terminating at its outer end in a discharge-screw, and means for varying the position of the can to regulate the discharge of the frozen substance.

33. In an ice-cream freezer, a freezer-can having a conical end terminating in a discharge-spout, a flared head forming the other end of the can and detachably connected thereto, a hollow dasher-shaft extending through said flared head and through which the cream is fed into the can, a head on said dasher-shaft and provided with transverse openings through which the cream is discharged into the can, a dasher connected to the head, and a conveyer connected to the dasher and conforming to the conical end and discharge-spout, of the can, substantially as described.

In testimony whereof I affix my signature in the presence of two witnesses.

HENRY J. GERNER.

Witnesses:
A. M. WILSON,
E. E. POTTER.